United States Patent
Grosserüschkamp et al.

(10) Patent No.: US 12,540,641 B2
(45) Date of Patent: Feb. 3, 2026

(54) WEIGHT-OPTIMIZED ROTOR SHAFT, AND PROCESS FOR MANUFACTURING SAME

(71) Applicant: ThyssenKrupp Steel Europe AG, Duisburg (DE)

(72) Inventors: Thomas Grosserüschkamp, Duisburg (DE); Claus Disser, Seligenstadt (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 314 days.

(21) Appl. No.: 18/265,696

(22) PCT Filed: Dec. 6, 2021

(86) PCT No.: PCT/EP2021/084358
§ 371 (c)(1),
(2) Date: Jun. 7, 2023

(87) PCT Pub. No.: WO2022/128563
PCT Pub. Date: Jun. 23, 2022

(65) Prior Publication Data
US 2024/0035512 A1    Feb. 1, 2024

(30) Foreign Application Priority Data
Dec. 15, 2020  (DE) .................. 10 2020 215 933.5

(51) Int. Cl.
*F16C 3/02*   (2006.01)
*H02K 7/00*   (2006.01)

(52) U.S. Cl.
CPC ........... *F16C 3/02* (2013.01); *F16C 2220/42* (2013.01); *F16C 2220/44* (2013.01); *H02K 7/003* (2013.01); *Y10T 403/7035* (2015.01)

(58) Field of Classification Search
CPC .... F16C 3/02; F16C 2220/42; F16C 2220/44; H02K 7/003; Y10T 403/7035
USPC ............................... 464/183; 72/207, 370.21
See application file for complete search history.

(56) References Cited

U.S. PATENT DOCUMENTS

| | | | |
|---|---|---|---|
| 3,425,888 A * | 2/1969 | Kellicutt | B31F 1/225 |
| 11,946,510 B2 * | 4/2024 | Dönges | H02K 1/28 |
| 12,068,638 B2 * | 8/2024 | Schröder | H02K 1/2766 |
| 2013/0008283 A1 | 1/2013 | Haas et al. | |
| 2021/0276073 A1 | 9/2021 | Filgertshofer | |

FOREIGN PATENT DOCUMENTS

| | | |
|---|---|---|
| DE | 2549230 A1 | 11/1975 |
| DE | 3428327 A1 | 2/1986 |
| DE | 4315503 A1 | 1/1994 |
| DE | 102008043488 A1 | 6/2009 |
| DE | 102009059265 A1 | 6/2011 |
| DE | 102010060927 A1 | 6/2012 |
| DE | 102012008015 A1 | 10/2013 |

(Continued)

OTHER PUBLICATIONS

International Search Report and Written Opinion for International Application No. PCT/EP2021/084358 mailed Apr. 7, 2022.

(Continued)

*Primary Examiner* — Greg Binda
(74) *Attorney, Agent, or Firm* — RMCK Law Group PLC

(57) ABSTRACT

The present invention relates to a rotor shaft and a method for producing a rotor shaft.

8 Claims, 1 Drawing Sheet

(56) References Cited

FOREIGN PATENT DOCUMENTS

| | | |
|---|---|---|
| DE | 102014106614 A1 | 11/2015 |
| DE | 102016215979 A1 | 3/2018 |
| DE | 102017122122 A1 | 3/2018 |
| DE | 102018114411 A1 | 12/2019 |
| DE | 102018212431 A1 | 1/2020 |
| DE | 102018122977 A1 | 3/2020 |
| DE | 102020003956 A1 | 1/2022 |
| WO | 2020058122 A1 | 3/2020 |

OTHER PUBLICATIONS

Prior Art from German Office Action for Application No. 10 2020 215 933.5.

\* cited by examiner

WEIGHT-OPTIMIZED ROTOR SHAFT, AND PROCESS FOR MANUFACTURING SAME

CROSS-REFERENCE TO RELATED APPLICATIONS

This application is a 371 U.S. National Stage of International Application No. PCT/EP2021/084358 filed Dec. 6, 2021 which claims the benefit of German Patent Application No. 10 2020 215 933.5 filed Dec. 15, 2020. The disclosures of each of the above applications are incorporated herein by reference in their entirety.

TECHNICAL FIELD

The invention relates to a rotor shaft and a method for producing a rotor shaft.

BACKGROUND ART

Rotor shafts are components inter alia in electric motors, in particular in electric motors for road-based electric or hybrid vehicles, and have the objective of transmitting the torque of the electric motor. A so-called rotor plate assembly is connected or fixed to the rotor shaft. The overall weight of such an embodiment is intended to be as low as possible in order to increase the range of the electric or hybrid vehicle or to reduce the current consumption. Rotor plate assemblies may be connected or fixed to the rotor shaft either in a non-positive-locking manner, for example, disclosed in the German Offenlegungsschrift DE 10 2014 106 614 A1, or positive-locking manner, for example, described in the German Offenlegungsschrift DE 10 2016 215 979 A1, or a combination thereof.

The non-positive-locking connection has the disadvantage that it brings about high tensions in the metal panels of the rotor plate assembly which have relatively high electromechanical losses in comparison with purely positive-locking connection or the combination of positive-locking and non-positive-locking connection. For the positive-locking connection, there are provided on the outer face of the rotor shaft geometries which are reproduced as a negative form in the individual plates of the rotor plate assembly in order to produce the positive-locking connection at this location. These geometries are introduced in a subtractive manner into the outer face of the rotor shaft, this means that the cross section of the rotor shaft is weakened. Therefore, the rotor shaft must be structurally configured in such a manner that this local thickness reduction is compensated for. Furthermore, during the generally non-cutting introduction of these geometries, force is introduced into the rotor shaft in a radial direction so that at this location the wall thickness has to be selected to be so large that a pipe which is provided as a blank for producing the rotor shaft is neither plastically nor resiliently deformed. This leads to a rotor shaft which is oversized at many locations with a correspondingly higher weight.

SUMMARY OF INVENTION

This object is achieved with a rotor shaft and a method for producing a rotor shaft having the features described herein. This object is achieved with a rotor shaft having the features of patent claim 1. This object is achieved with a method for producing a rotor shaft having the features of patent claim 6.

The inventors have found that on a rotor shaft which has a hollow shaft body having at least one profiling which extends externally on the shaft body in the longitudinal extent of the shaft body for positive-locking receiving or connection of a rotor plate assembly, by additionally providing internally on the shaft body at least one bead-like profiling, which extends in the longitudinal extent of the shaft body parallel with the profiling which extends externally on the shaft body, a substantially consistent thickness of the shaft body can be obtained so that the thickness of the shaft body can be reduced to a necessary minimum dimension which withstands the loads in the final use in order to save additional mass and thereby weight so that a weight-optimized rotor shaft can be provided. By providing the at least one bead-like profiling internally on the shaft body in the region and at the remote side of the profiling which extends externally on the shaft body in the longitudinal extent of the shaft body, the shaft body in the region of the externally extending profiling and consequently in the region of the positive-locking connection of rotor plate assemblies is also not subjected to any material weakening so that a weight-optimized configuration of the rotor shaft is first possible. The shaft body is pressure-rolled.

The profiling which extends externally on the shaft body in the longitudinal extent of the shaft body may be in the form of a recess and/or groove. Other geometric shapes which are suitable for receiving a rotor plate assembly in a positive-locking manner are also conceivable. Furthermore, the profiling which extends externally can be limited to a (part) portion or extend continuously on the shaft body. A plurality of profilings which extend over the circumference in the longitudinal extent may also be present in (part) portions or continuously. The at least one bead-like profiling is (consequently) always arranged in the region and parallel with the externally extending profiling. As a result of the at least one bead-like profiling, there is produced inside the hollow shaft body in section locally or partially when viewed over the inner circumference a cross sectional narrowing.

Other advantageous embodiments and developments will be appreciated from the following description. One or more features from the claims, the description and the drawings can be combined with one or more other features therefrom to form other embodiments of the invention. One or more features from the independent claims can also be combined with one or more other features.

According to one embodiment of the rotor shaft according to the invention, the rotor shaft has at least one end portion which is arranged at one end of the shaft body and which terminates the end of the shaft body. Consequently, the hollow shaft body is closed at least at one side or at one of the ends thereof by the end portion. Preferably, the rotor shaft has end portions which are arranged at both ends of the shaft body and which terminate the ends of the shaft body. In a particularly preferred manner, the end portion has a journal portion or both end portions each have a journal portion which is configured in such a manner that it/they can be rotatably received in corresponding bearings in the electrical component.

According to one embodiment of the rotor shaft according to the invention, the shaft body and optionally an end portion of the rotor shaft are pressure-rolled. Using pressure-rolling, at least the majority of the rotor shaft can be produced from a semi-finished product by means of pressure-rolling so that an end portion and the hollow shaft body of the rotor shaft is preferably produced or formed from a material by means of pressure-rolling in one piece and consequently in a weight-optimized manner.

According to a second aspect, the invention relates to a method for producing a rotor shaft having a hollow shaft body having at least one profiling which extends externally on the shaft body in the longitudinal extent of the shaft body, wherein the method comprises the following steps:

providing a metal semi-finished product;
forming a hollow shaft body from the semi-finished product;
producing at least one profiling which extends externally on the shaft body in the longitudinal extent of the shaft body during the forming operation or after the forming operation.

According to the invention, the forming is carried out by means of pressure-rolling in one or more pressure-rolling steps, wherein in the pressure-rolling step or in one of the pressure-rolling steps in the longitudinal extent of the shaft body at least one bead-like profiling is produced internally on the shaft body.

Pressure-rolling is intended to be understood to be a method for non-cutting shaping of rotationally symmetrical hollow bodies. In this instance, a semi-finished product, for example, a circular blank or a hollow profile, is tensioned and/or fixed to a pressing chuck and caused to rotate. At least one pressure disk/roller or another correspondingly suitable means is moved against the rotating semi-finished product so that a shaping is carried out partially by means of pressure tensions, which are introduced by the radially guided pressure-rollers into the material of the semi-finished product. The material flows and assumes in an axial processing step from one end to the other end of the semi-finished product the contour of the internal pressing chuck. If the pressing chuck is circular, the pressure-rolled shaft body receives a circular-cylindrical internal geometry. Preferably, the shaping of the pressing chuck is carried out in such a manner that internal geometries on the pressure-rolled shaft body can be implemented internally. During pressure-rolling, the at least one pressure plate/roller as a result of the direct action of pressure plastically deforms the material of the semi-finished product, wherein a defined axial movement of the at least one pressure disk/roller can lead to the starting wall thickness of the semi-finished product being reduced to an adjustable (end wall) thickness. If necessary, the inner contour of the pressure-rolled semi-finished product/shaft body can be directly molded by the pressing chuck. Additionally or alternatively, individual thicknesses can also be adjusted via the axial orientation of the shaft body. The pressure-rolling corresponds to the prior art.

According to the invention a negative form is, for example, considered in the pressing chuck or core which takes into account a bead-like profiling internally on the shaft body in the longitudinal extent in the shaft body which is intended to be produced.

In particular, hot-rolled or cold-rolled sheet metal workpieces, preferably made of an iron-based material, preferably of a steel material, pre-fabricated in the form of a circular blank or a hollow profile, are used as a metal semi-finished product. The thickness of the semi-finished product may be between 2.0 and 25 mm. The thickness is in particular at least 2.5 mm, preferably at least 3.5 mm and is in particular limited to a maximum of 22 mm, preferably a maximum of 20 mm.

In order to avoid repetition, reference may be made to the statements relating to the rotor shaft according to the invention.

According to one embodiment of the method according to the invention, the at least one profiling which extends externally on the shaft body in the longitudinal extent of the shaft body is produced in the region of and parallel at the side facing away from the bead-like profiling. In order to ensure that no weakening of the material is present, during the pressure-rolling in the pressure-rolling step or in one of the pressure-rolling steps the at least one bead-like profiling is adjusted internally on the shaft body so that subsequently the at least one profiling which extends externally on the shaft body is produced. The externally extending profiling is preferably produced in a cutting manner since in the context of tolerances the profiling for positive-locking receiving and connection of the rotor plate assemblies can be adjusted and introduced in a selective manner.

According to one embodiment of the method according to the invention, the internally provided bead-like profiling and the externally extending profiling are sized in such a manner that the thickness in the region of the profilings does not fall below the final thickness of the completed shaft body. This has the advantage that there is no material weakening in the region of the profilings and nonetheless a weight-optimized rotor shaft can be provided.

According to one embodiment of the method according to the invention, there is also further formed from the semi-finished product in addition to the shaft body an end portion which is produced before or after the forming of the shaft body. Preferably, a portion or the preform of the end portion is initially preformed or formed-on from the semi-finished product and finally formed either before or after the forming of the shaft body. It is thus possible from a semi-finished product to produce the majority of the rotor shaft integrally by means of pressure-rolling. The second end portion for completely closing the shaft body and consequently completing the rotor shaft can be produced as a separation portion and connected to the open end of the shaft body in a materially engaging, positive-locking and/or non-positive-locking manner.

BRIEF DESCRIPTION OF DRAWINGS

The invention will be explained in greater detail below with reference to the drawings. Identical components are given the same reference numerals. In detail.

BEST MODE FOR CARRYING OUT THE INVENTION

Figure 1:
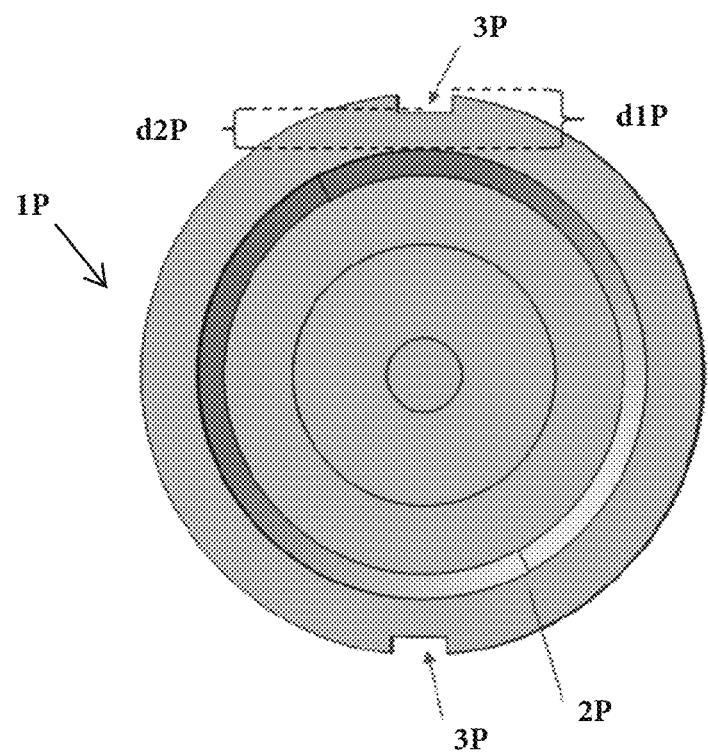
FIG. 1 shows a plan view of a section of a conventional rotor shaft according to Prior Art.
Figure 2:
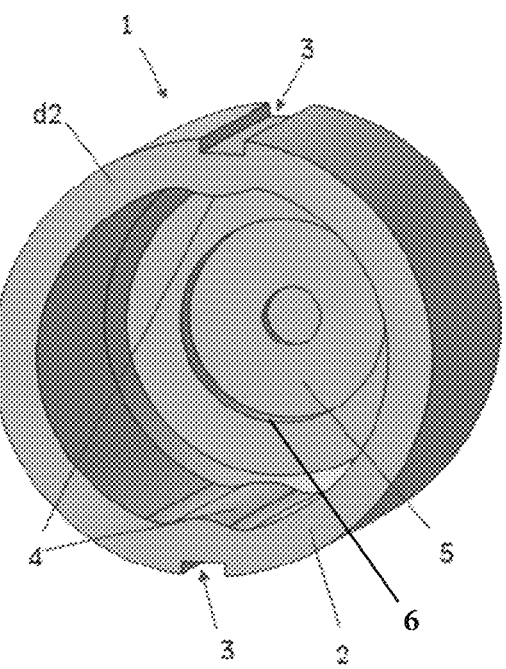
FIG. 2 shows a perspective view of a section of a rotor shaft according to an embodiment according to the invention.

FIG. 1 shows an example of a rotor shaft (1P) which has been produced in a conventional manner. The rotor shaft (1P) is in the form of a hollow shaft body (2P) and has a profiling (3P) in the longitudinal extent of the shaft body (2P), in this instance in the form of two grooves (3P) which have been introduced for positive-locking receiving and connection of a rotor plate assembly which is not illustrated. The reduction of the thickness of the shaft body (2P) in the region of the profiling (3P) can be clearly seen. The thickness (d1P) of the shaft body (2P) is reduced by the profiling (3P) in this region to the thickness (d2P). The shaft body (2P) would have sufficient dimensions with the thickness (d2P) but, as a result of the introduction of the profiling (3P) in the form of the grooves, the difference of (d1P) and (d2P)

is increased and ultimately in final use also moved as an unnecessary additional weight FIG. 2 shows an embodiment according to the invention of a rotor shaft (1) which in comparison with the conventional configuration in FIG. 1 in addition to a lower and substantially more uniform thickness (d2) of the shaft body (2) additionally has in the region of the at least one profiling (3) at least one bead-like profiling (4) which extends internally and parallel with the profiling (3). The bead-like profiling (4) which is provided at the inner side and the profiling (3) which extends at the outer side are sized in such a manner that the thickness in the region of the profilings (3, 4) does not fall below the final thickness (d2) of the completed shaft body (2). The rotor shaft (1) according to the invention can be produced for the most part by means of pressure-rolling, wherein the shaft body (2) and an end portion (5) of the rotor shaft (1) that closes the shaft body (2) are produced integrally from a semi-finished product. The rotor shaft (1) is completed by a separate component which forms the second end portion and which is connected to the open end of the shaft body (2) in a materially engaging, positive-locking and/or non-positive-locking manner, not illustrated in this instance. The end portions (5) also have journal portions (6) for rotatable bearing (not illustrated).

The features described, where technically possible, can all be combined with each other. Rotor shafts (1) according to the invention are used in electric drives, in particular in electric motors of road vehicles. The profiling (3) which extends externally on the shaft body (2) in the longitudinal extent of the shaft body (3) may be in the form of a recess and/or groove. Other geometric shapes, which are suitable for receiving a rotor plate assembly in a positive-locking manner are also conceivable. Furthermore, the profiling (3) which extends externally can be limited to a (part) portion or extend continuously on the shaft body (2). A plurality of profilings (2) which are distributed over the circumference, see FIG. 2, in the longitudinal extent may also be present in (part) portions or in a continuous manner. The bead-like profiling (4) is always arranged in the region and parallel with the externally extending profiling (3).

The invention claimed is:

1. A rotor shaft having a hollow shaft body having at least one profiling which extends externally on the shaft body in the longitudinal extent of the shaft body, wherein the shaft body is pressure-rolled and internally on the shaft body there is provided at least one bead-like profiling which extends in the longitudinal extent of the shaft body parallel with the profiling which extends externally on the shaft body, wherein the internally provided bead-like profiling and the externally extending profiling are sized in such a manner that the thickness in the region of the profilings does not fall below the final thickness of the completed shaft body, and wherein the rotor shaft has at least one end portion which is arranged at one end of the shaft body and which terminates the end of the shaft body, wherein the at least one end portion closes the shaft body.

2. The rotor shaft as claimed in claim 1, wherein the rotor shaft has end portions which are arranged at both ends of the shaft body and which terminate the ends of the shaft body.

3. The rotor shaft as claimed in claim 1, wherein the at least one end portion has a journal portion.

4. The rotor shaft as claimed in claim 3, wherein the shaft body and an end portion of the rotor shaft are pressure-rolled.

5. The rotor shaft of claim 1 wherein the at least one end portion is integrally formed with the shaft body.

6. A method for producing a rotor shaft having a hollow shaft body having at least one profiling which extends externally on the shaft body in the longitudinal extent of the shaft body, wherein the method comprises the following steps:
   providing a metal semi-finished product;
   forming a hollow shaft body from the semi-finished product; and
   producing at least one profiling which extends externally on the shaft body in the longitudinal extent of the shaft body during the forming operation or after the forming operation;
   wherein the forming is carried out by means of pressure-rolling in one or more pressure-rolling steps, wherein in the pressure-rolling step or in one of the pressure-rolling steps in the longitudinal extent of the shaft body at least one bead-like profiling is produced internally on the shaft body, wherein the internally provided bead-like profiling and the externally extending profiling are sized in such a manner that the thickness in the region of the profilings does not fall below the final thickness of the completed shaft body, and wherein the pressure-rolling further creates an end portion that is integrally formed with the shaft body and that terminates the end of the shaft body, wherein the end portion closes the shaft body.

7. The method as claimed in claim 6, wherein the at least one profiling which extends externally on the shaft body in the longitudinal extent of the shaft body is produced in the region of and parallel at the side facing away from the bead-like profiling.

8. The method as claimed in claim 7, wherein the at least one externally extending profiling is produced in a cutting manner.

* * * * *